(12) United States Patent
Nakayama et al.

(10) Patent No.: US 7,700,234 B2
(45) Date of Patent: *Apr. 20, 2010

(54) BINDER FOR ELECTRODE OF LITHIUM ION SECONDARY BATTERY

(75) Inventors: Akira Nakayama, Tokyo (JP); Takao Suzuki, Tokyo (JP)

(73) Assignee: Zeon Corporation, Tokyo (JP)

( * ) Notice: Subject to any disclaimer, the term of this patent is extended or adjusted under 35 U.S.C. 154(b) by 446 days.

This patent is subject to a terminal disclaimer.

(21) Appl. No.: 10/553,865

(22) PCT Filed: Apr. 22, 2004

(86) PCT No.: PCT/JP2004/005769

§ 371 (c)(1),
(2), (4) Date: Oct. 21, 2005

(87) PCT Pub. No.: WO2004/095613

PCT Pub. Date: Nov. 4, 2004

(65) Prior Publication Data

US 2006/0228627 A1    Oct. 12, 2006

(30) Foreign Application Priority Data

Apr. 24, 2003  (JP)  ............... 2003-120463

(51) Int. Cl.
*H01M 4/62* (2006.01)
(52) U.S. Cl. .............. 429/217; 429/128; 429/209; 429/231.9; 252/182.1; 526/72; 526/87
(58) Field of Classification Search ......... 429/128, 429/217, 209, 231, 95; 252/182.1; 526/87, 526/72
See application file for complete search history.

(56) References Cited

U.S. PATENT DOCUMENTS

| 5,595,841 A | 1/1997 | Suzuki | |
| 6,756,153 B1 * | 6/2004 | Yamamoto et al. | ......... 429/217 |
| 7,316,864 B2 * | 1/2008 | Nakayama et al. | ......... 429/217 |

FOREIGN PATENT DOCUMENTS

| JP | 8-287915 A | 11/1996 |
| JP | 11-149929 A | 6/1999 |
| JP | 2002-093420 A | 3/2002 |
| JP | 2003-45432 A | 2/2003 |
| JP | 2003132893 A * | 5/2003 |
| WO | WO-2002/039518 A1 | 5/2002 |

* cited by examiner

*Primary Examiner*—Jane Rhee
(74) *Attorney, Agent, or Firm*—Birch, Stewart, Kolasch & Birch, LLP

(57) ABSTRACT

A binder for electrode of lithium ion secondary battery, comprised of a copolymer composed of 15 to 80 weight % of units from ethylenically unsaturated monomer (A) whose homopolymerization yields a polymer soluble in N-methylpyrrolidone (NMP) and 20 to 85 weight % of units from ethylenically unsaturated monomer (B) whose homopolymerization yields a polymer insoluble in NMP, which copolymer exhibits a swelling degree of 4 or below, in an electrolyte obtained by dissolving $LiPF_6$ in the concentration of 1 mol/liter into a solvent of 1:2 (volume ratio at 20° C.) mixture of ethylene carbonate (EC) and diethyl carbonate (DEC). This binder for electrode of lithium ion secondary battery enables obtaining an electrode having a flexible electrode layer excelling in binding properties with industrial advantage.

15 Claims, No Drawings

BINDER FOR ELECTRODE OF LITHIUM ION SECONDARY BATTERY

TECHNICAL FIELD

The present invention relates to a binder for electrode of lithium ion secondary battery; a slurry composition for electrode of lithium ion secondary battery comprising the binder; an electrode for lithium ion secondary battery; a production method for the electrode; and a lithium ion secondary battery having the electrode.

BACKGROUND ART

Secondary batteries such as a lithium ion secondary battery are widely used as power sources of portable terminals, such as laptop computers, cellular phones and PDAs, which have remarkably spread in recent years. Recently, desires for extension of the operation time of portable terminals, and for shortening of the charging time thereof and the like have been increasing. Accordingly, an improvement in the performance of batteries, in particular, getting high capacity thereof and an improvement in the charging and discharging rate (rate characteristic) thereof have been intensely desired.

A lithium ion secondary battery has a structure wherein a positive electrode and a negative electrode are arranged in such a manner that a separator is interposed therebetween and the resultant is put, together with an electrolyte, into a container. The electrodes (positive electrode and negative electrode) are those that an active material for an electrode (hereinafter referred to merely as an "active material" according to the circumstances) and an optional electroconductivity supplying agent or the like are bonded to a current collector made of aluminum, copper or the like through a binder for electrode of lithium ion secondary battery (hereinafter referred to merely as a "binder" according to the circumstances). Usually, the electrodes are formed by dissolving or dispersing a binder into a liquid medium such as water or N-methylpyrrolidone (NMP), mixing an active material and so on therewith, applying the resultant slurry composition for electrode of lithium ion secondary battery (hereinafter referred to merely as a "slurry" according to the circumstances) onto a current collector, and then removing the liquid medium by drying or the like to bond the resultant as an electrode layer thereto.

The battery capacity thereof is intensely affected by the amount of the active material. The rate characteristic thereof is affected by the easiness of electron transfer. In order to improve the rate characteristic, it is effective to increase the amount of the electroconductivity supplying agent, such as carbon. In order to increase the amounts of the active material and the electroconductivity supplying agent inside a restricted space of the battery, it is necessary to decrease the amount of the binder. However, if the amount of the binder is made small, there is caused a problem that the bonding force of the electrode layer is reduced.

As a binder excellent in bonding power, there is known a copolymer made from an acrylic acid or methacrylic acid ester, acrylonitrile, and a vinyl monomer having an acid component (see JP-A-8-287915). This copolymer is insoluble in water and NMP; therefore, when a slurry is produced therefrom, the copolymer is used in the state that the viscosity thereof is adjusted to a viscosity suitable for the application thereof onto a current collector, using a thickener together.

However, the concentration of solid contents in the slurry is usually as high as 70% or more, thereby resulting in a problem that mixing of the slurry becomes insufficient or the components thereof aggregate so that the active material or the electroconductivity supplying agent are unevenly dispersed in the slurry. If the uneven slurry is used to form an electrode, the following problems arise: the ion conductivity thereof deteriorates so that the battery capacity lowers; and the bonding force of the active material is reduced so that the active material falls off from the current collector.

As a method for obtaining a slurry wherein an active material and an electroconductivity supplying agent are highly dispersed, suggested a method of mixing a paste A obtained by kneading an active material and a binder, with a paste B, obtained by kneading an electroconductivity supplying agent and a thickener, so as to yield a slurry (see JP-A-2003-45432). However, according to this method, the process therefor is complicated. Moreover, producing facilities become necessary for each of the pastes A and B and the slurry, and other large restrictions about facilities are also imposed.

There is also known a method for using, as a binder, a polymer soluble in NMP, such as polyvinylidene fluoride or polyacrylonitrile. However, the electrode produced by use of the binder is insufficient in flexibility; accordingly, its electrode layer may be cracked or fallen off when the electrode is folded or wounded and then put into a battery container.

DISCLOSURE OF THE INVENTION

Under such a situation, an object of the present invention is to provide: a binder for electrode of lithium ion secondary battery which is capable of obtaining, with industrial advantage, an electrode having a flexible electrode layer good in bonding force; a slurry for lithium ion secondary battery electrode, comprising the binder; an electrode for lithium ion secondary battery; a production method for the electrode; and a lithium ion secondary battery having the electrode.

In order to solve the above-mentioned problems, the inventors have made eager investigations so as to find out that a slurry wherein an active material and an electroconductivity supplying agent are highly dispersed and excelling in application, can be obtained by using, as a binder, a copolymer which comprises units of a monomer whose homopolymerization yields a polymer soluble in NMP and units of a monomer whose homopolymerization yields a polymer insoluble in NMP at a specific ratio and which exhibits a low swelling degree in a specific electrolyte. Furthermore, the inventors have found out that when the slurry is used, an electrode having a flexible electrode layer excellent in bonding force can be obtained. On the basis of these findings, the present invention has been made.

Thus, according to the present invention, a binder for electrode of lithium ion secondary battery which comprises a copolymer comprising:

15 to 80 weight % of units from an ethylenically unsaturated monomer (A) whose homopolymerization yields a polymer soluble in N-methylpyrrolidone (NMP); and 20 to 85 weight % of units from an ethylenically unsaturated monomer (B) whose homopolymerization yields a polymer insoluble in NMP; which copolymer exhibits a swelling degree of 4 or below, in an electrolyte obtained by dissolving $LiPF_6$ in the concentration of 1 mole/liter into a solvent of 1:2 (volume ratio at 20° C.) mixture of ethylene carbonate (EC) and diethyl carbonate (DEC) is provided.

According to the invention, provided is also a binder for electrode of lithium ion secondary battery which comprises a copolymer obtained by multistage-polymerizing: a component comprising at least one ethylenically unsaturated monomer whose homopolymerization yields a polymer soluble in NMP (this component being referred to as the component (a)); and a component comprising at least one ethylenically unsaturated monomer whose homopolymerization yields a polymer insoluble in NMP (this component being referred to as the component (b)); which copolymer exhibits a swelling degree of 4 or below, in an electrolyte obtained by dissolving $LiPF_6$ in the concentration of 1 mole/liter into a solvent of 1:2 (volume ratio at 20° C.) mixture of EC and DEC.

It is preferred that the multistage polymerization comprises a first polymerization step of polymerizing the component (a) and a subsequent second polymerization step of adding the component (b) thereto and polymerizing these components. It is more preferred that the first polymerization step is a step of polymerizing 15 to 80 parts by weight of the component (a) until the polymerization conversion ratio thereof reaches 60 to 97 weight %, and the second polymerization step is a step of adding 20 to 85 parts by weight of the component (b) thereto (wherein the amount of all the monomers is 100 parts by weight) and polymerizing the components until the polymerization conversion ratio reaches 90 weight % or more of all the monomers.

It is also preferred that the multistage polymerization comprises a three-stage polymerization process. It is more preferred that the multistage polymerization comprises a first polymerization step of adding a part of the component (a) and then polymerizing it, a subsequent second polymerization step of adding thereto the component (b) and polymerizing the components, and a subsequent third polymerization step of adding thereto the remaining component (a) and polymerizing the components. Furthermore, it is particularly preferred that the first polymerization step is a step of polymerizing 5 to 50 parts by weight of the component (a) until the polymerization conversion ratio thereof reaches 60 to 97 weight %, the second polymerization step is a step of adding 20 to 85 parts by weight of the component (b) thereto and polymerizing the components until the polymerization conversion ratio reaches 60 to 97 weight % of all the monomers added up to this step, and the third polymerization step is a step of adding 5 to 50 parts by weight of the component (a) thereto (wherein the amount of all the monomers is 100 parts by weight) and polymerizing the components until the polymerization conversion ratio reaches 90 weight % or more of all the monomers.

According to the invention, a slurry composition for electrode of lithium ion secondary battery which comprises the above-mentioned binder for lithium ion secondary battery electrode, an active material for an electrode, and an organic liquid medium is provided.

According to the invention, a production method for a lithium ion secondary battery electrode, wherein the above-mentioned slurry composition for electrode of lithium ion secondary battery is applied onto a current collector and then dried is provided.

According to the invention, a lithium ion secondary battery electrode wherein an electrode layer comprising the above-mentioned binder for electrode of lithium ion secondary battery and an active material for an electrode is bonded to a current collector; and a lithium ion secondary battery which comprises this electrode are provided.

BEST MODE FOR CARRYING OUT THE INVENTION

The present invention will be described along separated items in detail hereinafter.

(1) Binder for Electrode of Lithium Ion Secondary Battery.

The binder of the present invention for lithium ion secondary battery is a binder comprises a copolymer comprising:

15 to 80 weight % of units from an ethylenically unsaturated monomer (A) whose homopolymerization yields a polymer soluble in N-methylpyrrolidone (NMP), and 20 to 85 weight % from units from an ethylenically unsaturated monomer (B) whose homopolymerization yields a polymer insoluble in NMP, which copolymer exhibits a swelling degree of 4 or below, in an electrolyte obtained by dissolving $LiPF_6$ in the concentration of 1 mole/liter in to a solvent of 1:2 (volume ratio at 20° C.) mixture of EC and DEC.

Examples of the ethylenically unsaturated monomer (A), whose homopolymerization yields a polymer soluble in NMP, include α,β-ethylenically unsaturated nitrile compounds such as acrylonitrile, and methacrylonitrile;

aromatic vinyl compounds such as styrene, α-methylstyrene, β-methylstyrene, p-t-butylstyrene, and chlorostyrene; and ethylenically unsaturated carboxylic acid esters wherein the alkyl group bonded to the non-carbonyl oxygen atom has 6 or below carbon atoms, such as methyl acrylate, ethyl acrylate, propyl acrylate, isopropyl acrylate, n-butyl acrylate, isobutyl acrylate, methyl methacrylate, ethyl methacrylate, propyl methacrylate, isopropyl methacrylate, n-butyl methacrylate, isobutyl methacrylate, methyl crotonate, ethyl crotonate, propyl crotonate, butyl crotonate, and isobutyl crotonate. Of these, α,β-ethylenically unsaturated nitrile compounds and methyl methacrylate are preferred. These monomers may be used alone or in combination of two or more thereof.

Examples of the ethylenically unsaturated monomer (B), whose homopolymerization yields a polymer insoluble in NMP, include ethylenically unsaturated carboxylic acid esters wherein the alkyl group bonded to the non-carbonyl oxygen atom has 7 or more carbon atoms, such as 2-ethylhexyl acrylate, isooctyl acrylate, isodecyl acrylate, lauryl acrylate, stearyl acrylate, tridecyl acrylate, 2-ethylhexyl methacrylate, isooctyl methacrylate, isodecyl methacrylate, lauryl methacrylate, tridecyl methacrylate, stearyl methacrylate, and 2-ethylhexyl crotonate;

ethylenically unsaturated monocarboxylic acids such as acrylic acid, methacrylic acid, crotonic acid, and isocrotonic acid; ethylenically unsaturated dicarboxylic acids such as maleic acid, fumaric acid, citraconic acid, mesaconic acid, glutaconic acid, and itaconic acid;

conjugated dienes such as 1,3-butadiene, 2-methyl-1,3-butadiene (isoprene), 2,3-dimethyl-1,3-butadiene, and 1,3-pentadiene; and 1-olefins such as ethylene, propylene, and 1-butene. Of these, ethylenically unsaturated carboxylic acid esters wherein the alkyl group bonded to the non-carbonyl oxygen atom has 7 or more carbon atoms and conjugated dienes are preferred to yield a binder excellent in flexibility. Particularly preferred are ethylenically unsaturated carboxylic acid esters wherein the alkyl group bonded to the non-carbonyl oxygen atom has 7 or more carbon atoms.

The amount of the units of the ethylenically unsaturated monomer (A) is from 15 to 80 weight %, preferably from 20 to 75 weight %, more preferably from 25 to 70 weight % of all the monomer units.

The amount of the units of the ethylenically unsaturated monomer (B) is from 20 to 85 weight %, preferably from 25 to 80 weight %, more preferably from 30 to 75 weight % of all the monomer units.

In the case that the material of the binder comprises a copolymer made from the ethylenically unsaturated monomer (A) and the ethylenically unsaturated monomer (B), a good applicability when the binder is made into a slurry can be made compatible with the flexibility and the bonding force of the electrode produced by use of the slurry.

The binder of the present invention exhibits a swelling degree of 4 or below, preferably 3.5 or below, more preferably 3 or below in an electrolyte obtained by dissolving $LiPF_6$ in the concentration of 1 mole/liter into a solvent of 1:2 (volume ratio at 20° C.) mixture of EC and DEC. If the swelling degree is too large, the cycle characteristic and the rate characteristic are reduced. This would be based on the following reason: when the binder swells, the bonding force lowers gradually so that the active material falls off from the current collector or the swelling binder covers the current collector to hinder the transfer of electrons.

The swelling degree is measured by the following method: a cast film made of the binder is first formed in a usual way; the weight thereof is then measured; thereafter, the film is immersed into the above-mentioned electrolyte of 60° C. temperature; the immersed film is raised up after 72 hours; the electrolyte adhering onto the surfaces of the film is wiped with a paper towel; immediately the weight of the film is measured; and the swelling degree is calculated as a value of (the weight after the immersion)/(the weight before the immersion).

The production method for the binder is not particularly limited. Preferably, the binder can be obtained by multistage-polymerizing the ethylenically unsaturated monomer (A) and the ethylenically unsaturated monomer (B).

The wording "multistage-polymerizing" or "multistage polymerization" in the invention means that a part of a monomer is first polymerized, subsequently a monomer different therefrom in kind and/or blend ratio is added thereto, and the components are polymerized. The wording "'subsequently' the components are polymerized" means that in the state that the monomer in the previous polymerization step remains, that is, at the time when the polymerization conversion ratio does not become 100%, subsequent polymerization is performed.

The binder of the present invention is also a binder which comprises a copolymer obtained by multistage-polymerizing a component comprising at least one ethylenically unsaturated monomer whose homopolymerization yields a polymer soluble in NMP (this component being referred to as the component (a)), and a component comprising at least one ethylenically unsaturated monomer whose homopolymerization yields a polymer insoluble in NMP (this component being referred to as the component (b)), which copolymer exhibits a swelling degree of 4 or below in an electrolyte obtained by dissolving $LiPF_6$ in the concentration of 1 mole/liter into a solvent of 1:2 (volume ratio at 20° C.) mixture of EC and DEC.

The monomer used as each of the component (a) and the component (b) may be one monomer or a mixture of two or more monomers. In the case of using the mixture of two or more monomers, the component (a) may contain the ethylenically unsaturated monomer (B) as long as the polymer yielded by polymerizing the component (a) is soluble in NMP. The component (b) may contain the ethylenically unsaturated monomer (A) as long as the polymer yielded by polymerizing the component (b) is insoluble in NMP. In other words, when the copolymer yielded by copolymerizing the above-mentioned monomer mixture is soluble in NMP, the monomer mixture can be used as the component (a). When the copolymer is insoluble in NMP, the monomer mixture can be used as the component (b).

The multistage polymerization is preferably performed through two or three steps, and is more preferably performed through three steps. If the polymerization is performed through four or more steps, the process becomes complicated so that the productivity may fall.

When the polymerization is performed through two steps, the polymerization is preferably multistage polymerization having a first polymerization step of polymerizing the component (a) and a subsequent second step of adding the component (b) and polymerizing the components. The amount of the component (a) in the first polymerization step is preferably from 15 to 80 parts by weight, more preferably from 20 to 75 parts by weight, even more preferably from 25 to 70 parts by weight. The amount of the component (b) in the second polymerization step is preferably from 20 to 85 parts by weight, more preferably from 25 to 80 parts by weight, even more preferably from 30 to 75 parts by weight (wherein the amount of all the monomers is 100 parts by weight).

The polymerization conversion ratio in the first polymerization step is preferably from 60 to 97 weight %, more preferably from 65 to 97 weight %, even more preferably from 70 to 95 weight %. The polymerization conversion ratio in the second polymerization step is preferably 90 weight % or more, more preferably 95 weight % or more of all the monomers.

When the polymerization is performed through three steps, the polymerization is preferably multistage polymerization having a first polymerization step of adding the component (a) and polymerizing the component, a subsequent second polymerization step of adding thereto the component (b) and polymerizing the components, and a subsequent third polymerization step of adding thereto the component (a) and polymerizing the components. In this case, the component (a) used in the first polymerization step may be equal to or different from the component (a) used in the third polymerization step.

The amount of the component (a) in the first polymerization step is preferably from 5 to 50 parts by weight, more preferably from 5 to 45 parts by weight, even more preferably from 10 to 40 parts by weight; the amount of the component (b) in the second polymerization step is preferably from 20 to 85 parts by weight, more preferably from 25 to 80 parts by weight, even more preferably from 30 to 75 parts by weight; and the amount of the component (a) in the third polymerization step is preferably from 5 to 50 parts by weight, more preferably from 5 to 45 parts by weight, even more preferably from 10 to 40 parts by weight (wherein the amount of all the monomers is 100 parts by weight).

In each of the first and second polymerization steps, the polymerization conversion ratio is preferably from 60 to 97 weight %, more preferably from 65 to 97 weight %, even more preferably from 70 to 95 weight % of all the monomers added up to the step. In the third polymerization step, the polymerization conversion ratio is preferably 90 weight % or more, more preferably 95 weight % or more of all the monomers.

The binder yielded by the multistage polymerization gets satisfactory in bonding power, and the slurry yielded by use of this binder becomes a binder good in applicability wherein an active material and an electroconductivity supplying agent are highly dispersed.

The polymerization method for the binder of the invention is not particularly limited, and a known polymerization method may be adopted, an example of which is emulsion polymerization, suspension polymerization, dispersion polymerization, or solution polymerization. Of these, emulsion polymerization is preferred.

(2) Slurry Composition for Electrode of Lithium Ion Secondary Battery.

The slurry composition of the invention for electrode of lithium ion secondary battery comprises the above-mentioned binder, an active material for an electrode, and an organic liquid medium. The organic liquid medium is not particularly limited if the medium is a liquid medium wherein the binder can be dissolved or dispersed into the form of fine particles. Specific examples thereof include amides such as N-methylpyrrolidone, N,N-dimethylacetoamide, and dimethylformamide. Of these, N-methylpyrrolidone is particularly preferred because of being excelling in application onto a current collector and dispersion of the binder.

The method for dissolving or dispersing the binder of the invention into the organic liquid medium is not particularly limited. When the binder of the invention is produced into a latex form by emulsion polymerization, the method is, for example, a method of substituting a specific organic liquid material for water in the latex. An example of the method for the substitution is a method of adding an organic dispersion medium to the latex and then removing the water in the dispersion medium by distillation, a dispersion medium phase converting method or the like.

The amount of the organic liquid medium is adjusted in such a manner that the slurry composition gives a viscosity suitable for the application thereof in accordance with the kinds of the binder, and an active material and an electroconductivity supplying agent which will be described later. The concentration of solid contents in the total of the binder, the active material and the electroconductivity supplying agent is preferably from 50 to 90 weight %, more preferably from 70 to 90 weight %.

The active material used in the slurry of the invention is appropriately selected in accordance with the kind of the electrode. The slurry of the invention can be used for any one of a positive electrode and a negative electrode, and is preferably used for a positive electrode. The active material may be any material that can be used in an ordinary lithium ion secondary battery. Examples of the active material for a positive electrode include lithium-containing composite metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_3$; and transion metal oxides such as $Cu_2V_2O_3$, amorphous $V_2O$—$P_2O_5$, $MoO_3$, $V_2O_5$, and $V_6O_{13}$. Furthermore, an electroconductive polymer such as polyacetylene or poly-p-phenylene may be used.

Examples of the active material for a negative electrode include carbonous materials such as amorphous carbon, graphite, natural graphite, mesocarbon microbeads (MCMB), and pitch-based carbon fiber; and electroconductive polymers such as polyacene. The shape and the size of the active material are not particularly limited. The active material having a surface onto which an electroconductivity supplying agent is bonded by a mechanically reforming method may be used.

The slurry of the invention may contain, besides the binder of the invention, other binders different therefrom. The use of the other binder together makes it possible to adjust the viscosity or the fluidity of the slurry and the bonding force or flexibility of the electrode obtained by use of the slurry within broader ranges. The ratio of the amount of the binder of the invention to that of the other binder is not particularly limited, and the ratio by weight is preferably from 5:1 to 1:5, more preferably from 3:1 to 1:3.

Examples of the other binder include cellulose polymers such as carboxymethyl cellulose, methyl cellulose and hydroxypropylcellulose, and ammonium salts and alkali metal salts thereof; homopolymers each made from an $\alpha,\beta$-ethylenically unsaturated nitrile compound, such as polyacrylonitrile or polymethacrylonitrile; copolymers each made from an $\alpha,\beta$-ethylenically unsaturated nitrile compound and an 1-olefin, ethylenically unsaturated carboxylic acid or ethylenically unsaturated carboxylic acid ester; acrylic rubbers such as 2-ethylhexyl acrylate/methacrylic acid/acrylonitrile/ethylene glycol dimethacrylate copolymer, and butyl acrylate/acrylic acid/trimethylolpropane trimethacrylate copolymer; acrylonitrile/butadiene rubber, and hydrogenated product thereof; vinyl alcohol based polymers such as ethylene/vinyl alcohol copolymer, and vinyl alcohol/vinyl acetate copolymer; and fluorine-contained polymers such as polyvinylidene fluoride, polytetrafluoroethylene, and polypentafluoropropylene.

If necessary, an electroconductivity supplying agent is added to the slurry of the invention. The electroconductivity supplying agent that can be used may be a carbonous material such as graphite, activated carbon, acetylene black, ketchen black, furnace black, graphite, carbon fiber or a fullerene, an electroconductive polymer or a metal powder. Of these, acetylene black or furnace black is preferred. The amount of the used electroconductivity supplying agent is usually from 0.5 to 20 parts by weight, preferably from 1 to 10 parts by weight for 100 parts by weight of the active material.

If necessary, a viscosity adjustor, a fluidization agent or other components may be added to the slurry of the invention.

The slurry of the invention is produced by mixing the respective components. The mixing method thereof and the mixing order thereof are not particularly limited. When the binder of the invention is used, a slurry wherein the active material and the electroconductivity supplying agent are highly dispersed can be obtained regardless of the mixing method and the mixing order. For the mixing, a mixer may be used, examples of the mixer including a ball mill, a sand mill, a pigment disperser, a crusher, an ultrasonic disperser, a homogenizer, and a planetary mixer.

(3) Electrode of Lithium Ion Secondary Battery.

The electrode of lithium ion secondary battery of the invention is an electrode wherein an electrode layer comprising the above-mentioned binder and an active material for an electrode is bonded to a current collector.

The current collector is not particularly limited if the collector is made of an electroconductive material. Examples thereof include metals such as iron, copper, aluminum, nickel, and stainless steel. In particular, when aluminum is used for positive electrode and copper is used for negative electrode, the advantageous effects of the slurry of the invention are most satisfactorily exhibited. The shape of the current collector is not particularly limited, and the current collector is preferably in the form of a sheet having a thickness from about 0.001 to 0.5 mm.

(4) Production Method for an Electrode for Lithium Ion Secondary Battery

The electrode of the invention can be produced by applying the slurry of the invention onto a current collector, drying the slurry and thus bonding the resultant electrode layer, which comprises a binder, an active material, and optional components such as an electroconductivity supplying agent, onto the collector.

The method for applying the slurry onto the current collector is not particularly limited. Examples thereof include doctor blade, dipping, reverse roll, direct roll, gravure, and brush-painting methods. The amount of the applied slurry is not particularly limited, and is generally such an amount that the thickness of the electrode layer, which is formed after the organic liquid medium is dried and removed and comprises the active material, the binder and so on, can be set usually into the range of 0.005 to 5 mm, preferably into the range of 0.01 to 2 mm. The method for the drying is not particularly limited, and examples thereof include drying with warm wind, hot wind, low humid wind, vacuum drying, and a drying method based on the radiation of (far) infrared rays, electron beams, or the like. The speed for the drying is adjusted in such a manner that the liquid medium can be removed as rapidly as possible within such a speed range that the electrode layer is not cracked by stress concentration and the electrode layer is not fallen off from the current collector. The dried current collector may be pressed, thereby heightening the density of the active material in the electrode. Examples of the method for the pressing include mold-pressing and roll-pressing.

(5) Lithium Ion Secondary Battery

The lithium ion secondary battery of the invention is a battery comprising the above-mentioned electrode for lithium ion secondary battery.

The lithium ion secondary battery can be produced by an ordinary method using the above-mentioned electrode, an electrolyte, and members such as a separator. In a specific example of the production process, a negative electrode and a positive electrode are overlapped with each other in the state that a separator is interposed therebetween, and this is wounded or folded in accordance with the battery shape and put into a battery container. An electrolyte is poured into the battery container and then the container is sealed up. If necessary, an expanding metal, an overcurrent protecting element such as electric fuse or PTC element, a lead plate, and so on are put into the container, thereby making it possible to prevent a rise in the pressure inside the battery and overcharge/overdischarge. The shape of the battery may the shape of a coin, a button, a sheet, a cylinder, rectangular, flat or any other shape.

The electrolyte may be in a gel or liquid form if the electrolyte is an electrolyte that can be used in an ordinary lithium ion secondary battery. It is advisable to select an electrolyte which causes battery function to be exhibited in accordance with the kinds of the negative active material and the positive active material.

As the electrolyte, any known lithium salt can be used. Examples thereof include $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiCF_3SO_3$, $LiCH_3SO_3$, $LiC_4F_9S_3$, $Li(CF_3SO_2)_2N$, and lower aliphatic acid carboxylic acid lithium salts.

The medium for dissolving these electrolytes (electrolyte solvent) is not particularly limited. Specific examples thereof include carbonates such as propylene carbonate, ethylene carbonate, butylene carbonate, dimethyl carbonate, ethylmethyl carbonate, and diethyl carbonate; lactones such as γ-lactone; ethers such as trimethoxymethane, 1,2-dimethoxyethane, diethyl ether, 2-ethoxyethane, tetrahydrofuran, and 2-methyltetrahydrofuran; and sulfoxides such as dimethylsulfoxide. Of these, carbonates are preferred since they are excellent in chemical, electrochemical and thermal stabilities.

These medium may be used alone or in the form of a mixed solvent of two or more thereof. The binder of the invention has a low swelling degree in carbonates; therefore, it does not happen that on the basis of the swelling of the binder, the bonding force thereof falls, whereby the active material falls off from the current collector or that the binder covers the current collector to hinder the transfer of electrons.

EXAMPLES

The present invention will be described by way of the following working examples. However, the invention is not limited thereto. In the working examples, the expressions "part(s)" and "%" are based on "weight", unless otherwise specified.

Tests and evaluations in the working examples and comparative examples were made by the following methods.

(1) Polymerization Conversion Ratio

The polymerization conversion ratio at the time of polymerization reaction was obtained from the weight of solid contents obtained by drying a dispersion of the polymer in water by calculation. The polymerization conversion ratio represents the polymerization conversion ratio to the total amount of the monomer(s) added up to the stage.

(2) Swelling Degree in an Electrolyte

The swelling degree of a polymer used as a binder in an electrode was obtained by the following method:

A liquid which is 0.2 g of the polymer was dissolved or dispersed in 10 mL of N-methylpyrrolidone was caused to flow and extend onto a sheet made of polytetrafluoroethylene, and then dried to yield a cast film. A piece of 4 cm² area was cut out from this cast film, and the weight thereof was measured. Thereafter, the piece was immersed into an electrolyte of 60° C. temperature. The immersed film was raised up after 72 hours, and then the electrolyte adhering onto the film surfaces was wiped with a paper towel. Immediately, the weight of the film was measured. The value of (the weight after the immersion)/(the weight before the immersion) was defined as the swelling degree. As the electrolyte, there was used an electrolyte obtained by dissolving $LiPF_6$ in the concentration of 1 mole/liter into a solvent of 1:2 (volume ratio at 20° C.) mixture of ethylene carbonate (EC) and diethyl carbonate (DEC).

(3) Composition Ratio in a Polymer

The ratio between units from an ethylenically unsaturated monomer (A) capable of giving a homopolymer soluble in NMP (an NMP soluble component) and units from an ethylenically unsaturated monomer (B) capable of giving a homopolymer insoluble in NMP (an NMP insoluble component) was obtained by $^1$H— and $^{13}$C-NMR measurements.

(4) Peel Strength

<Production of a Positive Electrode>

A slurry for a positive electrode was applied evenly onto one surface of an aluminum foil (thickness: 20 μm) by a doctor blade method. The resultant was dried at 120° C. in a drying machine for 45 minutes. Furthermore, the resultant was dried at 120° C. under a reduced pressure of 0.6 kPa in a vacuum drying machine for 2 hours, and then pressed with a biaxial roll press so as to set the electrode density into 3.3 g/cm³. In this way, a positive electrode was yielded.

<Production of a Negative Electrode>

A slurry for a negative electrode was applied evenly onto one surface of an aluminum foil (thickness: 18 μm) by a doctor blade method. The resultant was dried under the same conditions as about the positive electrode. The resultant was then pressed with a biaxial roll press so as to set the electrode density into 1.4 g/cm³. In this way, a negative electrode was yielded.

<Measurement of Peel Strength>

The electrode (the positive electrode or negative electrode) obtained by the above-mentioned method was cut into a rectangular piece 2.5 cm wide and 10 cm long. The piece was fixed in the state that its electrode layer surface was directed upwards. A cellophane tape was stuck onto the electrode layer surface. The stress (N/cm) generated when the electrode was fixed and the tape was peeled off at a rate of 50 mm/minute in the direction of 180° angle was measured 10 times. The average value thereof was calculated, and the resultant was defined as the peel strength. As this value is larger, the bonding power is higher and it is more difficult to fall off the active material from the current collector.

(5) Bending Test

The electrode obtained by the method in the item (4) was cut into rectangular pieces 3 cm wide and 9 cm long to be used as test pieces. The test piece was put onto a desk, and a stainless steel round bar of 1 mm diameter was set onto the current collector side surface thereof in the state that the bar was positioned at the piece center in the longitudinal direction (at a place 4.5 cm apart from ends thereof) and was laid along the short direction. The test piece was bent at 180° around this stainless bar. The state of the coating film (electrode layer) on the outside of the bent portion was observed. 10 test pieces were tested. A case wherein a crack or falling was not generated at all in the ten pieces was judged as "good". A case wherein one or more spots were cracked or fallen in at least one of the pieces was judged as "poor". The matter that the electrode layer is not cracked or fallen demonstrates that the electrode is excellent in flexibility.

(6) Battery Capacity, and Charge and Discharge Cycle Characteristic

<Production of a Lithium Ion Secondary Battery (for Evaluating a Positive Electrode)>

For evaluating a positive electrode, metal lithium was used as a negative electrode.

The positive electrode produced in the method described in the item (4) was cut out into a circle of 15 mm diameter. A separator made of a circular polypropylene porous film of 18 mm diameter and 25 μm thickness, lithium metal as the negative electrode, and an expanding metal were successively laminated onto the electrode layer side face of this positive electrode. This was put into a coin-shaped outer-packaging container (diameter: 20 mm, height: 1.8 mm, and stainless steel thickness: 0.25 mm), made of stainless steel, to which a polypropylene packing was fitted. An electrolyte was injected into this container without leaving any air. A stainless steel cap of 0.2 mm thickness was put and fixed, through the polypropylene packing, onto the outer-packaging container. The battery can was sealed up to produce a coin-shaped battery (for evaluating the positive electrode) of 20 mm diameter and about 2 mm thickness. The used electrolyte was the same as used to measure the swelling degree.

<Production of a Lithium Ion Secondary Battery (for Evaluating a Negative Electrode)>

For evaluating a negative electrode, metal lithium was used as a positive electrode.

The negative electrode produced in the method described in the item (4) was cut out into a circle of 15 mm diameter. A separator, lithium metal as the positive electrode, and an expanding metal were successively laminated onto the electrode layer side face of this negative electrode. This was put into a coin-shaped outer-packaging container, and subsequent steps were carried out in the same way as in the production of the positive-evaluating battery, so as to produce a coin-shaped battery (for evaluating the negative electrode). As the separator, the coin-shaped outer-packaging container, and the electrolyte, the same for evaluating the positive electrode were used.

<Measurements of Battery Capacity and Charge and Discharge Cycle Characteristic>

The coin-shaped batteries produced by the above-mentioned methods were used to repeat charge and discharge by a 0.1 C constant electric current method at 23° C. and at voltages from 3 to 4.2 V for positive electrode evaluation and at voltages from 0 to 1.2 V for negative electrode evaluation, respectively. The discharge capacities at a $3^{rd}$ cycle and at a $50^{th}$ cycle were measured. The discharge capacity thereof in the $3^{rd}$ cycle was defined as the battery capacity. The unit thereof is mAh/g (of the active material).

The ratio of the discharge capacity in the $50^{th}$ cycle to that in the $3^{rd}$ cycle was calculated by percentage. As this value is larger, a reduction in the capacity is smaller and thus the charge and discharge cycle characteristic is better.

(8) Charge and Discharge Rate Characteristic

The discharge capacity in the $3^{rd}$ cycle in each constant current amount was measured in the same way as in the measurement of battery capacity except that the measurement condition was changed to 1 C of constant electric current amount. The rate of the discharge capacity in 1 C to that in 0.1 C in the $3^{rd}$ cycle was calculated by percentage. As this value is larger, the faster charge and discharge can be done and thus the charge and discharge rate characteristic is better.

Example 1

400 parts of ion-exchange water, 26 parts of acrylonitrile, 5 parts of sodium dodecylbenzenesulfonate and 3 parts of potassium persulfate were charged into an autoclave with a stirrer, and then the solution was sufficiently stirred. Thereafter, the solution was heated to 60° C. to initiate polymerization at a first stage. When the polymerization conversion ratio reached 85%, thereto were added 48 parts of 2-ethylhexyl acrylate as a monomer for a second stage to continue the reaction. When the polymerization conversion ratio at the second stage reached 90%, thereto were added 26 parts of acrylonitrile as a monomer for a third stage. When the polymerization conversion ratio reached 99%, the solution was cooled to stop the polymerization. Lithium hydroxide was added to the latex yielded in the above-mentioned three-stage polymerization to adjust the pH thereof to 7. Next, thereto was added N-methylpyrrolidone (NMP) in an amount 3 times larger than the total weight of the latex, and then water therein was volatilized with an evaporator to yield a dispersion of a polymer A-1 in NMP, having a solid content concentration of 8%.

Into a planetary mixer were charged 100 parts of lithium cobaltate as an active material and 3 parts of acetylene black (Denka Black, manufactured by Denki Kagaku Kogyo Co., Ltd.) as an electroconductivity supplying agent. Thereto was added NMP to set the solid content concentration to 90%, and the resultant was stirred for 20 minutes to mix the components. Thereafter, to the solution was added one part of the solution of the polymer A-1 in NMP. The amount of the solution was an amount based on solid contents. The resultant was kneaded at a solid content concentration of 82% for 90 minutes. Thereafter, to the resultant was added NMP to adjust the slurry viscosity. This slurry was used to form a positive electrode. The composition and the swelling degree of the polymer A-1, and characteristics of the resultant electrode and battery were measured. The results are shown in Table 1.

Example 2

Polymerization at a first stage was initiated in the same way as in Example 1 except that the amount of acrylonitrile for the first stage was changed to 40 parts. When the polymerization conversion ratio reached 90%, thereto were added a mixture of 58 parts of 2-ethylhexyl acrylate and 2 parts of methacrylic acid as monomers for a second stage. When the polymerization conversion ratio reached 98%, the slurry was cooled to stop the polymerization. In this way, a latex was yielded by the two-stage polymerization. Thereafter, the same way as in Example 1 was carried out to yield a dispersion of a polymer A-2 in NMP, having a solid content concentration of 8 weight %. This polymer A-2 was used to form a positive electrode. The composition and the swelling degree of the polymer A-2, and characteristics of the electrode and battery obtained by use of this polymer were measured. The results are shown in Table 1.

Example 3-5

Polymers A-3 to A-5 were each yielded in the same way as in Example 1 except that each formulation shown in Table 1 was used. The composition and the swelling degree of each of the resultant polymers, and characteristics of the electrode and battery produced in the same way as in Example 1 by use of the polymer were measured. The results are shown in Table 1.

Example 6

A polymer A-6 was yielded in the same way as in Example 2 except that a formulation shown in Table 1 was used. The composition and the swelling degree of the resultant polymer, and characteristics of the electrode and battery produced in the same way as in Example 1 by use of the polymer were measured. The results are shown in Table 1.

Example 7

A dispersion of a polymer A-7 in NMP was yielded in the same way as in Example 1 except that a formulation shown in Table 1 was used.

Into a planetary mixer were charged 1.3 parts of the solution of the polymer A-7 in NMP, the amount of the solution being based on solid contents, and 96 parts of mesocarbon microbeads as an active material, and then thereto was added NMP so as to set the solid content concentration to 65%. The resultant slurry was stirred to mix the components therein. This slurry was used to form a negative electrode. The composition and the swelling degree of the resultant polymer A-7, and characteristics of the electrode and battery yielded by use of the polymer were measured. The results are shown in Table 1.

Comparative Example 1

A polymer B-1 was yielded in the same way as in Example 1 except that a polymerization conversion ratio in each polymerization stage was changed as shown in Table 1. The resultant polymer was dissolved in the electrolyte (the swelling degree thereof was infinitely large). The composition and the swelling degree of the resultant polymer, and characteristics of the electrode and battery produced in the same way as in Example 1 by use of the polymer were measured. The results are shown in Table 1.

Comparative Example 2

400 parts of ion-exchange water, 40 parts of acrylonitrile, 58 parts of 2-ethylhexyl acrylate, 2 parts of methacrylic acid, 5 parts of sodium dodecylbenzenesulfonate and 3 parts of potassium persulfate were charged into an autoclave with a stirrer, and then the solution was sufficiently stirred. Thereafter, the solution was heated to 60° C. to initiate polymerization. When the polymerization conversion ratio reached 96%, the slurry was cooled to stop the polymerization. In this way, a latex was yielded by one-stage polymerization. Thereafter, a polymer B-2 was yielded in the same way as in Example 1. The resultant polymer was dissolved in the electrolyte (the swelling degree thereof was infinitely large). The composition and the swelling degree of the resultant polymer, and characteristics of the electrode and battery produced in the same way as in Example 1 by use of the polymer were measured. The results are shown in Table 1.

Comparative Example 3

A polymer B-3 was yielded in the same way as in Comparative Example 2 except that a formulation shown in Table 1 was used. In the resultant polymer, the composition ratio of the NMP soluble component (A)/the insoluble component (B) was 12/88. This polymer B-3 was used to attempt to form a positive electrode in the same way as in Example 1. However, the fluidity of the slurry was bad. At the time of press, the coating film was fallen off from the current collector. As a result, no electrode was permitted to be produced.

Comparative Example 4

400 parts of ion-exchange water, 0.3 part of partially-saponificated polyvinyl alcohol, 0.2 part of methylcellulose, 0.2 part of azobisisobutyronitrile, and 100 parts of acrylonitrile were charged into an autoclave with a stirrer, so as to continue reaction at 80° C. for 8 hours, thereby yielding a homopolymer B-4 of acrylonitrile. The composition and the swelling degree of the resultant polymer, and characteristics of the electrode and battery produced in the same way as in Example 1 by use of the polymer were measured. The results are shown in Table 1.

TABLE 1

| | Examples | | | | | | |
|---|---|---|---|---|---|---|---|
| | 1 | 2 | 3 | 4 | 5 | 6 | 7 |
| Binder | A-1 | A-2 | A-3 | A-4 | A-5 | A-6 | A-7 |
| First-polymerization components (parts) | | | | | | | |
| 2-Ethylhexyl acrylate | | | | | | | |
| Acrylonitrile | 26 | 40 | 20 | 16 | | | 25 |
| Methacrylic acid | | | | | | | |
| Methyl methacrylate | | | | | 20 | 40 | |
| First-polymerization conversion ratio (%) | 85 | 90 | 70 | 81 | 72 | 88 | 85 |

TABLE 1-continued

| Second-polymerization components (parts) | | | | | | | |
|---|---|---|---|---|---|---|---|
| 2-Ethylhexyl acrylate | 48 | 58 | 58 | 68 | | 60 | |
| Dodecyl acrylate | | | | | 60 | | |
| Butadiene | | | | | | | 55 |
| Methacrylic acid | | 2 | 2 | | | | |
| Second-polymerization conversion ratio (%) | 90 | 98 | 85 | 80 | 85 | 97 | 90 |
| Third-polymerization component (parts) | | | | | | | |
| Acrylonitrile | 26 | | 20 | 16 | 20 | | 20 |
| Third-polymerization conversion ratio (%) | 99 | | 97 | 95 | 97 | | 96 |
| Composition ratio in the polymer (NMP soluble component/insoluble component) | 52/48 | 40/60 | 40/60 | 32/68 | 40/60 | 40/60 | 45/55 |
| Swelling degree in the electrolyte | 1.7 | 1.8 | 2 | 1.8 | 2.2 | 2 | 1.6 |
| Electrode characteristics | | | | | | | |
| Electrode kind | Positive electrode | Positive electrode | Positive electrode | Positive electrode | Positive electrode | Positive electrode | Negative electrode |
| Used binder amount (part (s)) | 1 | 1 | 1 | 1 | 1 | 1 | 1.3 |
| Peel strength (N/cm) | 0.09 | 0.10 | 0.10 | 0.08 | 0.08 | 0.08 | 0.10 |
| Bending test | Good | Good | Good | Good | Good | Good | Good |
| Battery characteristics | | | | | | | |
| Battery capacity (mAh/g) | 145 | 147 | 145 | 146 | 142 | 145 | 345 |
| Charge and discharge cycle characteristic (%) | 69 | 66 | 63 | 65 | 65 | 68 | 75 |
| Charge and discharge rate characteristic (%) | 49 | 42 | 43 | 46 | 45 | 48 | 65 |

| | Comparative Examples | | | |
|---|---|---|---|---|
| | 1 | 2 | 3 | 4 |
| Binder | B-1 | B-2 | B-3 | B-4 |
| First-polymerization components (parts) | | | | |
| 2-Ethylhexyl acrylate | | 58 | 83 | |
| Acrylonitrile | 26 | 40 | 12 | 100 |
| Methacrylic acid | | 2 | 5 | |
| Methyl methacrylate | | | | |
| First-polymerization conversion ratio (%) | 55 | 96 | 98 | 97 |
| Second-polymerization components (parts) | | | | |
| 2-Ethylhexyl acrylate | 48 | | | |
| Dodecyl acrylate | | | | |
| Butadiene | | | | |
| Methacrylic acid | | | | |
| Second-polymerization conversion ratio (%) | 50 | | | |
| Third-polymerization component (parts) | | | | |
| Acrylonitrile | 26 | | | |
| Third-polymerization conversion ratio (%) | 98 | | | |
| Composition ratio in the polymer (NMP soluble component/insoluble component) | 52/48 | 40/60 | 12/88 | 100/0 |
| Swelling degree in the electrolyte | Dissolved | Dissolved | 2.8 | 1.3 |
| Electrode characteristics | | | | |
| Electrode kind | Positive electrode | Positive electrode | Unable to be produced | Positive electrode |
| Used binder amount (part (s)) | 1 | 1 | — | 1.5 |
| Peel strength (N/cm) | 0.08 | 0.10 | — | 0.10 |
| Bending test | Good | Good | — | Poor |
| Battery characteristics | | | | |
| Battery capacity (mAh/g) | 138 | 127 | — | 138 |
| Charge and discharge cycle characteristic (%) | 39 | 40 | — | 38 |
| Charge and discharge rate characteristic (%) | 28 | 25 | — | 28 |

Production Example 1

A polymer C was yielded in the same way as in Comparative Example 2 except that a formulation shown in Table 2 was used. The composition and the swelling degree of the resultant polymer are shown in Table 2.

Production Example 2

A polymer D was yielded in the same way as in Comparative Example 4 except that 97 parts of acrylonitrile and 3 parts of acrylic acid were used instead of 100 parts of acrylonitrile. The composition and the swelling degree of the resultant polymer are shown in Table 2.

Production Example 3

A polymer E was yielded in the same way as in Production Example 2 except that the amount of acrylonitrile was set to 90 parts and 10 parts of methyl acrylate were used instead of 3 parts of acrylic acid. The composition and the swelling degree of the resultant polymer are shown in Table 2.

TABLE 2

|  | C | D | E | F |
|---|---|---|---|---|
| Polymer composition (weight %) | | | | |
| 2-Ethylhexyl acrylate | 86 | | | |
| Acrylonitrile | 9 | 97 | 90 | |
| Acrylic acid | 4 | 3 | | |
| Diethylene glycol dimethacrylate | 1 | | | |
| Methyl acrylate | | | 10 | |
| Vinylidene fluoride | | | | 100 |
| Composition ratio in the polymer (NMP soluble component/insoluble component) | 9/91 | 97/3 | 90/10 | 100/0 |
| Swelling degree in the electrolyte | 1.7 | 1.4 | 1.6 | 1.3 |

Example 8

100 parts of lithium cobaltate as an active material and 3 parts of acetylene black (manufactured by Denki Kagaku Kogyo Kabushiki Kaisha) as an electroconductivity supplying agent were charged into a planetary mixer. Thereto was added NMP to set the solid content concentration to 90%, and the resultant was stirred for 20 minutes to mix the components. Thereafter, to this solution was added 0.5 part of the dispersion of the polymer A-1 in NMP yielded in Example 1 and 0.5 part of the dispersion of the polymer C having a composition and a swelling degree shown in Table 2. The amounts of the dispersions were amounts based on solid contents. The resultant was kneaded at a solid content concentration of 82% for 90 minutes. Furthermore, to the resultant was added NMP to adjust the slurry viscosity. This slurry was used to form a positive electrode. The ratio of the NMP soluble component to the NMP insoluble component in all of the used binders and characteristics of the resultant electrode and battery were measured. The results are shown in Table 3.

Examples 9-11, and Comparative Examples 5 and 6

Electrodes were each formed in the same way as in Example 8 except that the kind and the amount of the polymer used as a binder were rendered those shown in Table 3. As the polymer F, a polyvinylidene fluoride, #1100 (manufactured by Kureha Chemical Industry Co., Ltd.) was used. The ratio of the NMP soluble component to the NMP insoluble component in all of the used binders and characteristics of the resultant electrode and battery were measured. The results are shown in Table 3.

TABLE 3

|  | Examples | | | | Comparative Examples | |
|---|---|---|---|---|---|---|
|  | 8 | 9 | 10 | 11 | 5 | 6 |
| Binder kind | A-1 | A-1 | A-2 | A-4 | B-3 | B-4 |
| Used binder amount (part) | 0.5 | 0.7 | 0.7 | 0.4 | 0.7 | 0.3 |
| Binder used together | | | | | | |
| PolymerC (part) | 0.5 | | | 0.5 | | 0.7 |
| PolymerD (part) | | 0.3 | | | | |
| PolymerE (part) | | | 0.3 | | | |
| PolymerF (part) | | | | 0.3 | 0.3 | |
| Binder composition ratio (NMP soluble component/insoluble component) | 31/69 | 66/34 | 55/45 | 39/61 | 38/62 | 36/62 |
| Electrode characteristics | | | | | | |
| Peel strength (N/cm) | 0.11 | 0.12 | 0.10 | 0.10 | 0.06 | 0.06 |
| Bending test | Good | Good | Good | Good | Good | Good |
| Battery characteristics | | | | | | |
| Battery capacity (mAh/g) | 143 | 144 | 141 | 146 | 120 | 131 |
| Charge and discharge cycle characteristic (%) | 67 | 67 | 69 | 70 | 32 | 45 |
| Charge and discharge rate characteristic (%) | 44 | 43 | 46 | 48 | 25 | 31 |

The electrodes produced by use of the binder of the invention exhibited an excellent bonding force and a high flexibility whether the binder was used alone or used together with a different binder. The lithium ion secondary batteries each having one of these electrodes had a high battery capacity and a good cycle characteristic and further were excellent in the rate characteristic (Examples 1 to 11). On the other hand, in cases where a binder soluble in the electrolyte was used, the flexibility of the electrodes was high but the batteries produced therefrom were poor in resistance against the electrolyte; therefore, the charge and discharge cycle characteristic and the charge and discharge rate characteristic thereof lowered (Comparative Examples 1 and 2).

When a binder wherein the amount of the component insoluble in NMP was too large was used, an even slurry was not easily yielded and thus no electrode was permitted to be produced (Comparative Example 3). On the other hand, when a binder wherein the amount of the component soluble in NMP was too large was used, the resultant electrode was poor in flexibility so that its electrode layer might be cracked or fallen. The battery produced therefrom exhibited a low charge and discharge cycle characteristic and a low charge and discharge rate characteristic (Comparative Example 4). When a binder wherein the amount of the component soluble in NMP was too large and a binder wherein the amount of the component insoluble in NMP was too large were used together, an even slurry was not easily yielded and thus a poor bonding force was exhibited. The performance of the batteries yielded therefrom was also poor (Comparative Examples 5 and 6).

Some of the embodiments of the present invention have been described above by way of the above-mentioned working examples. It is evident for those skilled in the art that embodiments wherein the working examples are modified can be carried out as long as the embodiments do not depart from the subject matter and the concept of the present invention. Such modified embodiments are included in the scope of the invention. The above-mentioned comparative examples have been described in order to demonstrate that the working examples are concerned with excellent embodiments by the comparison between the working examples and the comparative examples. Accordingly, the objects of the invention may be attained in accordance with the contents of the comparative examples.

INDUSTRIAL APPLICABILITY

The use of the binder of the invention, for lithium ion secondary battery electrode, makes it possible to yield easily an electrode having a flexible electrode layer good in bonding force. This electrode is excellent in electrolyte resistance; accordingly, the lithium ion secondary battery having this electrode has a high charge and discharge capacity and a good cycle characteristic, and also exhibits an excellent rate characteristic.

The invention claimed is:

1. A binder for electrode of lithium ion secondary battery, which comprises a copolymer comprising:
    15 to 80 weight % of units from an ethylenically unsaturated monomer (A) whose homopolymerization yields a polymer soluble in N-methylpyrrolidone (NMP); and
    20 to 85 weight % of units from an ethylenically unsaturated monomer (B) whose homopolymerization yields a polymer insoluble in NMP;
    which copolymer exhibits a swelling degree of 4 or below in an electrolyte obtained by dissolving $LiPF_6$ in the concentration of 1 mole/liter into a solvent of 1:2 (volume ratio at 20° C.) mixture of ethylene carbonate (EC) and diethyl carbonate (DEC).

2. A binder for electrode of lithium ion secondary battery, which comprises a copolymer obtained by multistage-polymerizing comprising:
    15 to 80 weight % of a component comprising at least one ethylenically unsaturated monomer whose homopolymerization yields a polymer soluble in N-methylpyrrolidone (NMP) (component (a)); and
    20 to 85 weight % of a component comprising at least one ethylenically unsaturated monomer whose homopolymerization yields a polymer insoluble in NMP (component (b));
    which copolymer exhibits a swelling degree of 4 or below, in an electrolyte obtained by dissolving $LiPF_6$ in the concentration of 1 mole/liter into a solvent of 1:2 (volume ratio at 20° C.) mixture of ethylene carbonate (EC) and diethyl carbonate (DEC).

3. The binder for electrode of lithium ion secondary battery according to claim 2, wherein the multistage polymerization comprises a first polymerization step of polymerizing the component (a) and a subsequent second polymerization step of adding the component (b) thereto and polymerizing these components.

4. The binder for electrode of lithium ion secondary battery according to claim 3, wherein
    the first polymerization step is a step of polymerizing 15 to 80 parts by weight of the component (a) until the polymerization conversion ratio thereof reaches 60 to 97 weight %, and
    the second polymerization step is a step of adding 20 to 85 parts by weight of the component (b) thereto (wherein the amount of all the monomers is 100 parts by weight) and polymerizing the components until the polymerization conversion ratio reaches 90 weight % or more of all the monomers.

5. The binder for electrode of lithium ion secondary battery according to claim 2, wherein the multistage polymerization comprises a three-stage polymerization process.

6. The binder for electrode of lithium ion secondary battery according to claim 5, wherein the multistage polymerization comprises
    a first polymerization step of adding a part of the component (a) and then polymerizing it, a subsequent second polymerization step of adding thereto the component (b) and polymerizing the components, and
    a subsequent third polymerization step of adding thereto the remaining component (a) and polymerizing the components.

7. The binder for electrode of lithium ion secondary battery according to claim 6, wherein
    the first polymerization step is a step of polymerizing 5 to 50 parts by weight of the component (a) until the polymerization conversion ratio thereof reaches 60 to 97 weight %,
    the second polymerization step is a step of adding 20 to 85 parts by weight of the component (b) thereto and polymerizing the components until the polymerization conversion ratio reaches 60 to 97 weight % of all the monomers added up to this step, and
    the third polymerization step is a step of adding 5 to 50 parts by weight of the component (a) thereto (wherein the amount of all the monomers is 100 parts by weight) and polymerizing the components until the polymerization conversion ratio reaches 90 weight % or more of all the monomers.

8. A slurry composition for electrode of lithium ion secondary battery, which comprises the binder for electrode of lithium ion secondary battery as claimed in claim 1, an active material for an electrode, and an organic liquid medium.

9. The slurry composition for electrode of lithium ion secondary battery according to claim 8, wherein the organic liquid medium is N-methylpyrrolidone.

10. A production method for a lithium ion secondary battery electrode, wherein the slurry composition for electrode of lithium ion secondary battery as claimed in claim 8 is applied onto a current collector and then dried.

11. A lithium ion secondary battery electrode, wherein an electrode layer comprising the binder for electrode of lithium ion secondary battery as claimed in claim 1 and an active material for an electrode is bonded to a current collector.

12. A lithium ion secondary battery, which comprises the electrode as claimed in claim 11.

13. A binder for an electrode of a lithium ion secondary battery, which comprises a copolymer obtained by multi-stage-polymerizing comprising:
    (a) 15 to 80 weight % a component comprising at least one ethylenically unsaturated monomer whose homopolymerization yields a polymer soluble in N-methylpyrrolidone (NMP) (component (a)); and (b) 20 to 85 weight % of a component comprising at least one ethylenically unsaturated monomer whose homopolymerization yields a polymer insoluble in NMP (component (b));

wherein the copolymer exhibits a swelling degree of 4 or below, in an electrolyte obtained by dissolving $LiPF_6$ in the concentration of 1 mole/liter into a solvent of 1:2 (volume ratio at 20° C.) mixture of ethylene carbonate (EC) and diethyl carbonate (DEC), and wherein the multistage-polymerization of the components (a) and (b) comprises two or three steps.

14. The binder for an electrode of a lithium ion secondary battery according to claim 13, wherein the multistage-polymerization of the components (a) and (b) comprises two steps, and wherein a polymerization conversion ratio in the first polymerization step is from 60 to 97 weight %, and a polymerization conversion ratio in the second polymerization step is 90 weight % or more.

15. The binder for an electrode of a lithium ion secondary battery according to claim 13, wherein the multistage-polymerization of the components (a) and (b) comprises three steps, and wherein a polymerization conversion ratio in the first polymerization step is from 60 to 97 weight %, a polymerization conversion ratio in the second polymerization step is from 60 to 97 weight %, and a polymerization conversion ratio in the third polymerization step is 90 weight % or more.

* * * * *